March 10, 1942.　　　C. J. GRIEDER　　　2,275,753
METER SUPPORT FOR ELECTRIC SERVICE EQUIPMENT
Filed Jan. 21, 1939　　　3 Sheets-Sheet 1
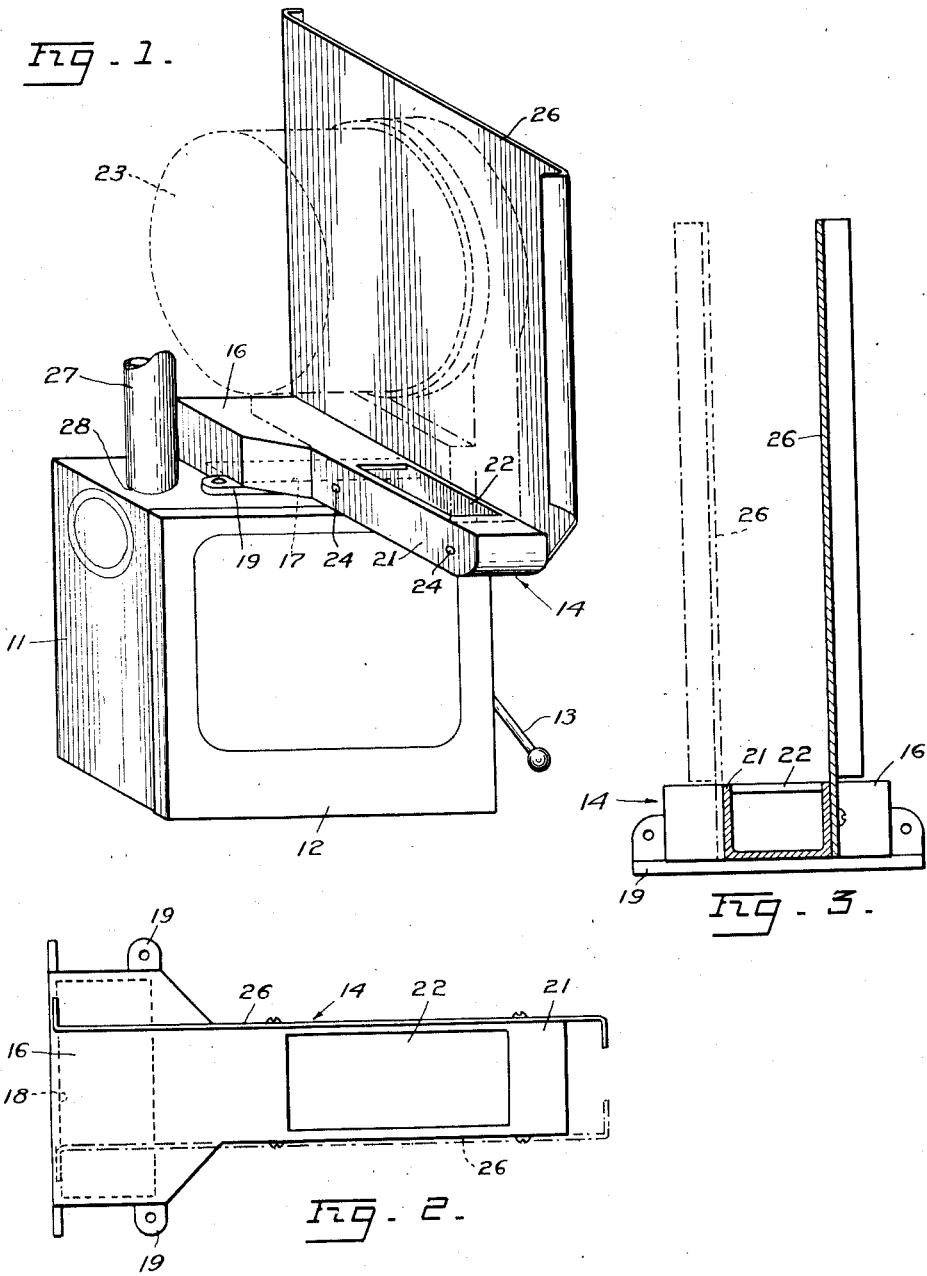
INVENTOR.
CONRAD J. GRIEDER
BY George B. White
ATTORNEY.

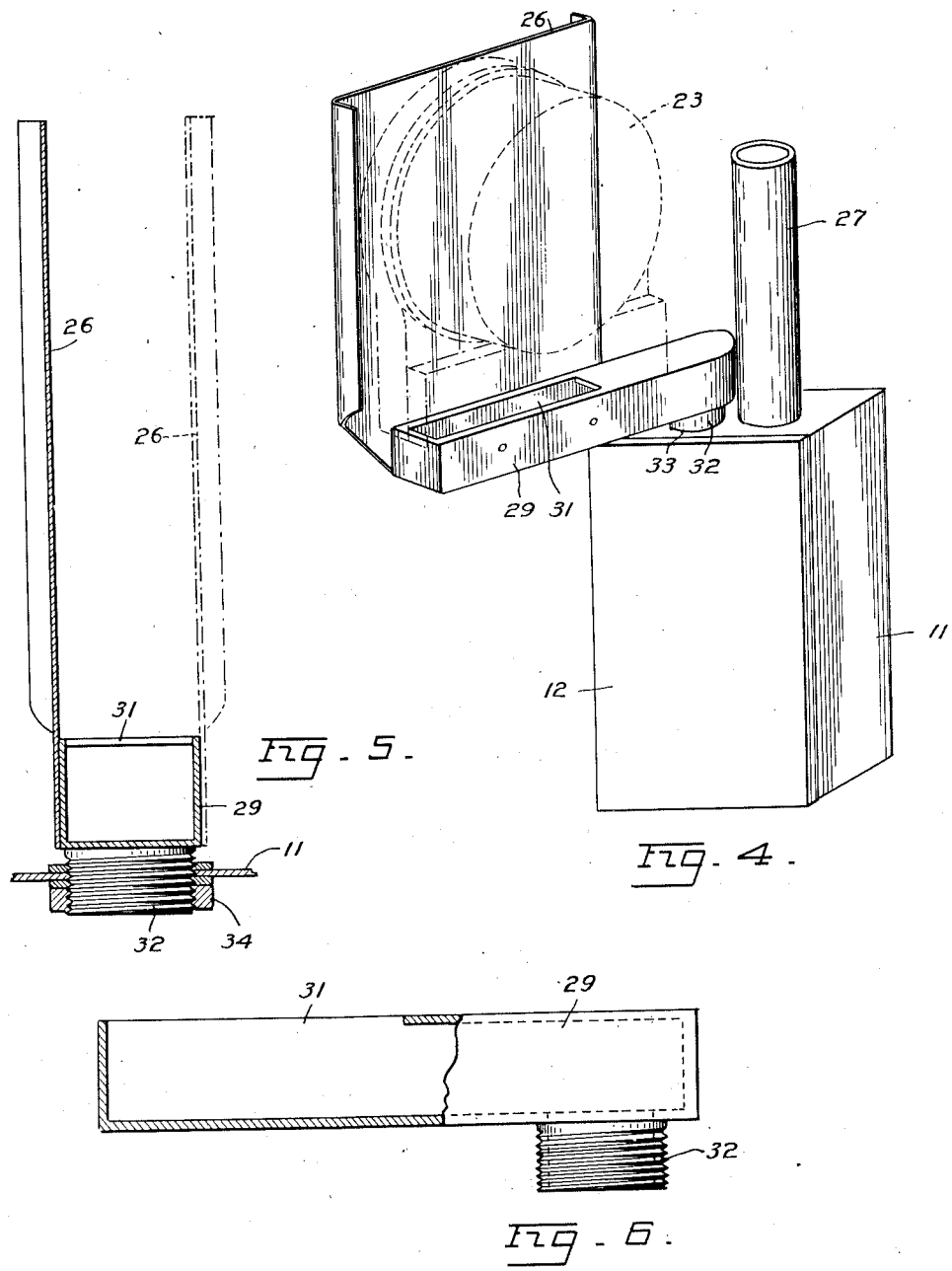

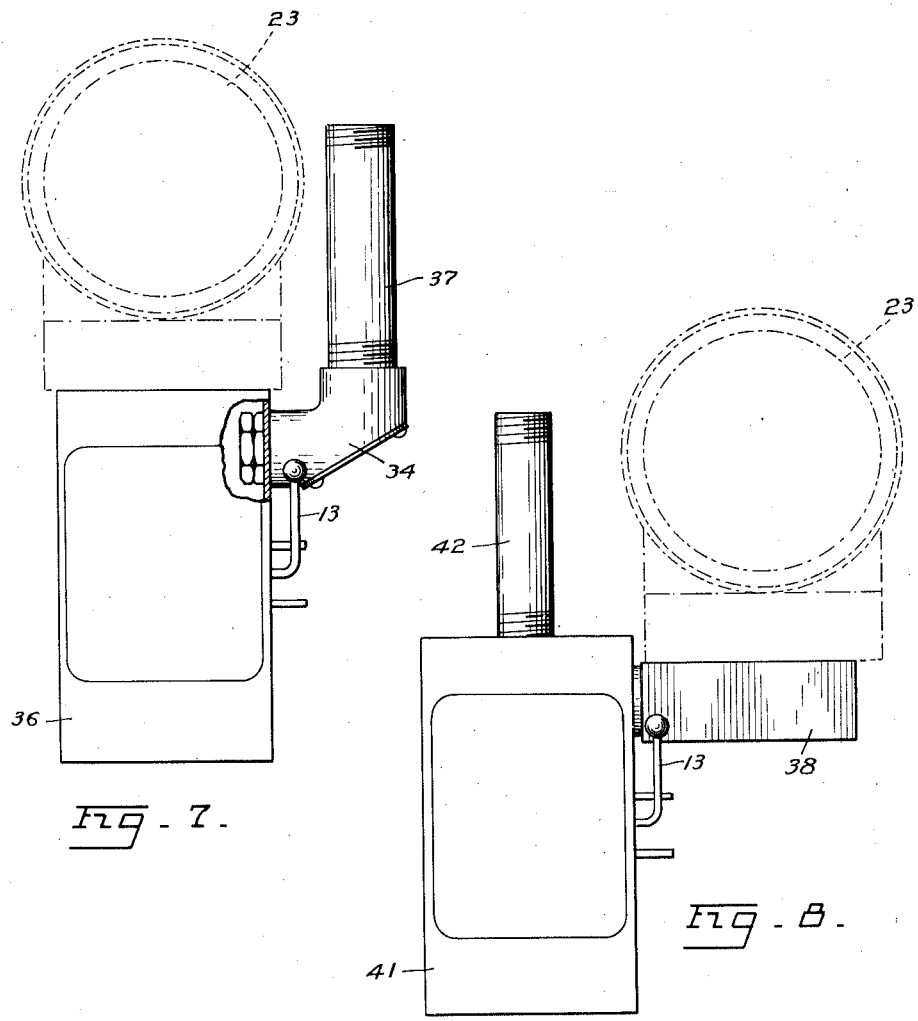

Patented Mar. 10, 1942

2,275,753

UNITED STATES PATENT OFFICE 2,275,753

METER SUPPORT FOR ELECTRIC SERVICE EQUIPMENT

Conrad J. Grieder, San Francisco, Calif.

Application January 21, 1939, Serial No. 252,137

4 Claims. (Cl. 175—224)

This invention relates to meter supports for electric service equipment.

The primary object of the invention is to provide a support on switch boxes or on boxes for electric service equipment, on which a meter can be supported in a suitable position for ready observation without necessitating the offset location of the box, and thereby allowing the connection of the usual service conduit to the box alongside the meter and eliminating the fitting of elbows or other fittings now needed on the usual service pipes.

Another object of the invention is to provide a meter support adapted to be attached to a switchbox or the like so as to support a meter in an observable position and at a selected angle on said box.

Another object of this invention is to provide a meter support for a switch box or the like in such a manner as to support the meter on the box in an observable position and permit connection of the vertical service conduit without elbows or other fittings.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description reference is had to the accompanying drawings for the illustrative embodiment of the invention, wherein:

Fig. 1 is an isometric view of a switch box with my adapter thereon.

Fig. 2 is a top plan view of the meter support adapter.

Fig. 3 is a vertical, sectional view of the meter support adapter.

Fig. 4 is an isometric view of another switch box showing an angularly adjustable meter support.

Fig. 5 is a vertical sectional view of said adjustable meter support.

Fig. 6 is a side view partly in section of said adjustable meter support.

Fig. 7 is a front view of a box with a meter support on its top and a side extension to receive the end of a service conduit.

Fig. 8 is a front view of a box and a meter support extended from the side of the box.

Fig. 9 is a top plan view of said side meter support; and

Fig. 10 is a top plan view of a switch box with an elongated knockout for meter connection.

In the usual installations of service equipment, and particularly, of switch boxes, it is difficult to find the optimum location and angle of arrangement for the meter relatively to an opening or point of observation unless separate mountings and fittings and remote connections are employed. In fact in many instances a remote connection and mounting is required to provide for the necessary position of the meter relatively to a window or opening so that the meter may be conveniently read by a meter service man. This difficulty can be avoided by mounting the meter on the switch box, and preferably by mounting the meter on the switch box in such a manner as to allow exposure of the meter at selected angles and directions without altering the angle of mounting of the switch box itself. An added difficulty of special fittings and the like for the service conduit is obviated by providing knockouts on top of the switch box for the service conduits alongside said meter.

In carrying out my invention I make use of a usual box 11 having sides and a front door 12. The box 11 is adapted to contain the usual electric service equipment such as fuses, switches and the like. In the herein illustration the box 11 is a switch box which contains a safety switch operated from the outside by the usual handle 13. This switch box 11 may be mounted in the usual manner in a suitable place in the building.

In the preferred form of my device I provide a hollow bracket 14, an enlarged or widened head 16 of which fits over an elongated hole 17 in the top of the box 11. This elongated hole 17 may be oval or rectangular as shown respectively in full and broken lines in Fig. 10. On the bottom of the head 16 is an opening 18 which is aligned with the hole 17 in the top of the box 11. The head 16 is secured in place by any suitable means such as screws or the like extended through suitable ears 19 on the bracket head 16. From about the center of the head 16 and at right angles thereto, but in the same plane, is formed a trough-like extension 21 which has a top opening 22 to fit the base of the usual electric current meter 23, the latter being shown in broken lines. In other words the hollow bracket 14 is formed in the shape of a T the head 16 of which is secured over a hole 17 of the switch box 11 and the leg of which forms the hollow trough-like extension 21 open at its top to accommodate a usual meter 23 thereon. Inasmuch as the hole 17 on the switch box 11 is longitudinal of the top of the box, the extension 21 extends at right angles to the plane of the box door 12. The meter 23 in this arrangement faces to one side and substantially at right angles to the box 11.

The opposite sides of the extension 21 are provided with equally spaced threaded holes 24. A backing plate 26 may be secured selectively to either side of the extension 21 so as to allow the mounting of the meter 23 on either face of the plate 26 facing in a selected direction.

It is to be noted that the service conduit 27 can be easily connected alongside the meter 26 into a knockout hole 28 on the top of the box 11 in a perpendicular position. All the electric wires between the service conduit, the meter and the switch are inclosed in and extended through the cavity of the hollow bracket 16 and the box 11.

The embodiment shown in Figures 4, 5, and 6, is similar to the form heretofore described, except that this embodiment is not formed in T shape but it consists only of a trough-like hollow body 29 which has an elongated hole 31 at its top near one end to fit the base of the usual meter 23. From the underside of the other end of this body 29 extends a tubular inlet boss 32 at right angles to the axis of the body 29. This boss 32 fits through a knockout hole 33 in the top of the box 11. The boss 32 is externally threaded and is suitably tightened in place such as by the usual locknut 34 or the like inside of the box 11. The backing plate 26 may be secured to either side of the hollow body 29. This hollow body 29 is therefore adjustable around the knockout hole 33 as a fulcrum to any selected angle and this angular adjustment together with the selective facing of the backing plate 26 on either side of the hollow body 29 gives a great degree of adjustability to the attachment so as to provide for a variety of positions of the meter to locate the meter in a position where it may be best observable.

In Fig. 7 an adapter 34 fits into a side knockout hole of small switch box 36. The meter 23 is mounted directly upon the top of this box 36 which latter is provided at its top with an elongated preferably rectangular hole to accommodate the base of the meter 23. The adapter 34 consists of an adapter box the lower end of which is extended through a side knockout hole of the box 36 and is secured in adjusted position by a suitable locknut inside the box 36. The other end is externally threaded to receive the threaded end of a perpendicular service conduit 37. This arrangement allows the meter 23 to be set directly on the top of the small switch box 36, and also allows the service conduit 37 to extend straight down into the adjusted adapter 34.

In the embodiment shown in Figures 8 and 9 the adapter consists of a trough 38 open at one side to fit the base of the meter 23. At an end of the trough 38 is a threaded boss 39 which is suitably secured in a knock out hole in the side of the switch box 41 by a locknut or the like. The service conduit 42 in this form connects to a knock-out hole in the top of the switch box 41. In the forms shown in Figures 7 and 8 the meter 23 may be secured directly to the board.

In all the forms and embodiments of my invention the meter is supported on the switch box at such an angle as to be readily observable, yet the service conduit is allowed to extend perpendicularly and directly either to the adapter or to a top hole of the switch box. The device is simple in construction, it can be easily installed in adjusted positions, it does not require any special mounting, and it eliminates costly difficulty heretofore encountered in mounting a meter and service equipment boxes where meter readings could be easily taken.

Having thus described my invention what I now claim and desire to secure by Letters Patent is:

1. The combination with a switch box or the like, of a meter support attachment, comprising a hollow body, a head of said body having an aperture fitting over a hole in a wall of the switch box, a hollow stem extended from said head substantially at right angles to the axis of the hole in said wall and having an aperture fitting to the base of a usual meter said last aperture facing in a direction opposite to the direction of said first aperture, means to secure said head in place, means to hold a meter on said second aperture substantially parallel with the axis of said body, and means to interchangeably secure said holding means along either side of said second aperture to respectively face the meter in opposite directions.

2. The combination with a switch box and the like having an opening for meter connection on a wall thereof; of a meter support, comprising, a hollow bracket, an end of said bracket fitting over said opening, the outer end of said bracket extending beyond the front face of the box and at an angle to the mounting plane at the back of the box, and a supporting element interchangeably mountable on either side of the outer end of the bracket to face with the meter in a selected direction.

3. A meter adapter bracket for switch boxes and the like, comprising a hollow body, a head at one end of the body fitting over the meter opening of the box at an angle to the axis of said body, a meter seat at the other end of said body communicating with the cavity in the hollow body, and a meter mounting frame adapted to be selectively aligned with either side of the meter seat to support the meter facing in a selected direction.

4. In combination, a switch box having an opening on its top for meter connections, a hollow bracket, a head of the bracket fitting over the meter opening of the box, a hollow stem of the body extended in a direction away from the back of the box and beyond the front face of the box, an elongated meter seat formed axially on the free end of the bracket stem, and a meter supporting frame adapted to be interchangeably located on the stem along either of the opposite sides of the meter seat to correspondingly face the meter in a selected direction on said seat.

CONRAD J. GRIEDER.